April 3, 1951 C. L. LUNDGREN 2,547,083
EXTENSIBLE TIRE CARRIER
Filed Aug. 23, 1948
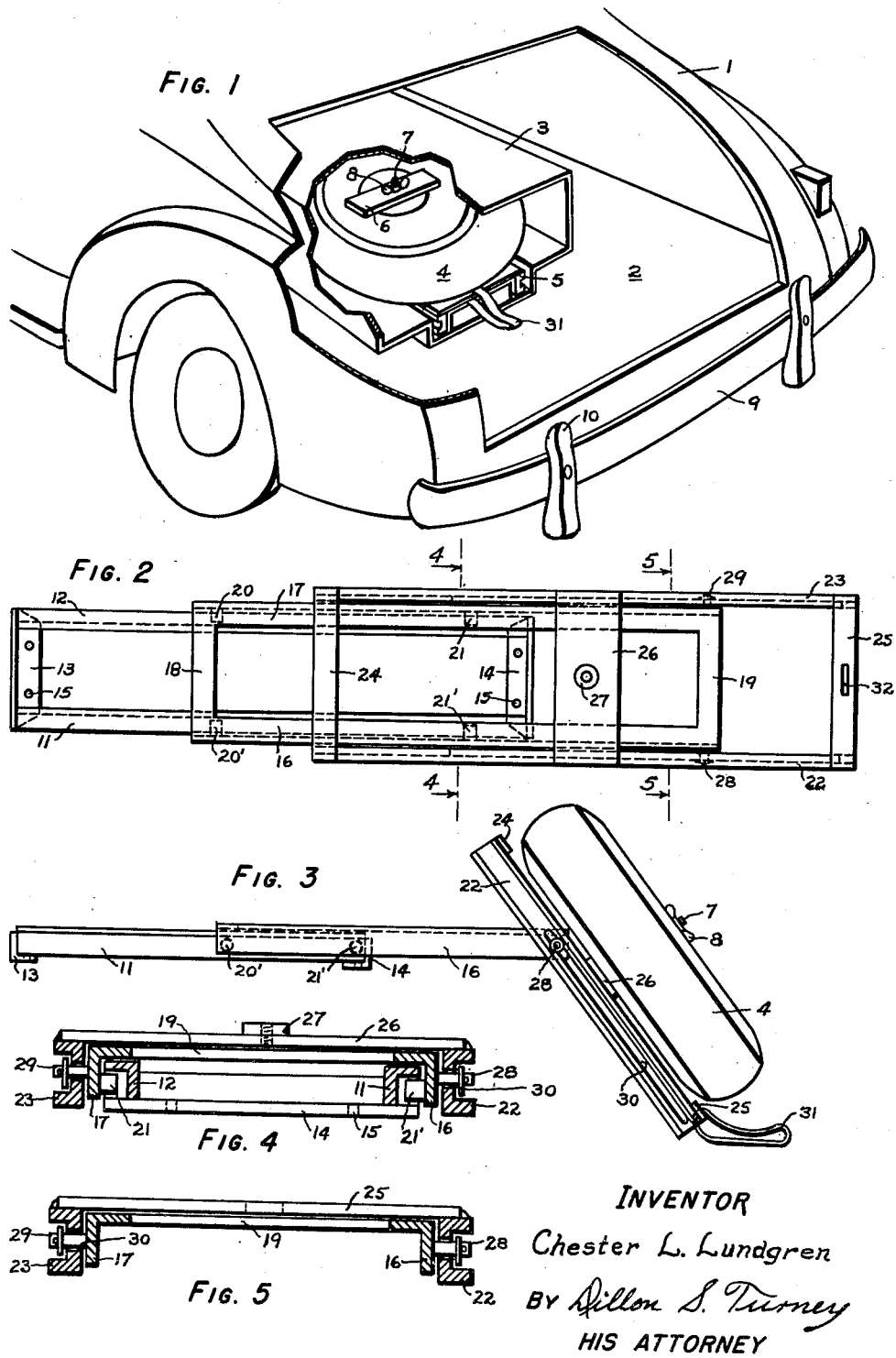
INVENTOR
Chester L. Lundgren
BY Dillon S. Turney
HIS ATTORNEY Patented Apr. 3, 1951

2,547,083

UNITED STATES PATENT OFFICE 2,547,083

EXTENSIBLE TIRE CARRIER

Chester L. Lundgren, Bonaparte, Iowa

Application August 23, 1948, Serial No. 45,610

6 Claims. (Cl. 224—42.21)

My invention relates to a tire carrier for automobiles and more particularly to an improved type of extensible and retractable spare tire carrier for automobile luggage compartments.

Almost every motorist has at one time or other experienced considerable difficulty and distress in removing the spare tire from the luggage compartment in the automobile and in replacing the damaged or repaired tire. This is often occasioned by the relatively inaccessible location of the spare tire which is usually located at the extreme forward part of the compartment, and which is aggravated by the presence of luggage, packages, tools and other articles which are normally carried in this compartment, and may cover entirely the spare tire. It is frequently necessary to remove a large number of heavy articles as well as to drag the heavy tire and wheel out of the compartment and the reverse operations must again be performed following the change of the tire. For some persons, particularly women and elderly people, this is an extreme physical hardship which might, under certain circumstances, seriously affect the health of the motorist.

It is therefore an object of my invention to provide a simple, manually-operated, extensible tire carrier for passenger automobiles.

It is a further object of my invention to provide an extremely compact and efficient sliding carriage type of tire carrier which is adapted for installation in a wide variety of existing automobiles.

It is still another object of my invention to provide a simple, economically constructed tire carrier for automobiles which allows the spare tire to be removed quickly and easily and replaced in its storage compartment in an automobile with a minimum of physical exertion or discomfort.

In accordance with my invention, I provide a plurality of sliding platforms or frames which are nested or interconnected so that the overall height and width occupied by the carrier itself is small, and which at the same time requires a minimum of parts with resultant savings in manufacturing cost and simplicity of operation. In addition, a tire containing housing slightly larger than the overall dimensions of the tire may be provided into which the carrier itself is positioned, thereby permitting the use of the luggage space above the tire for storage of additional articles since the top of the housing will act as a permanent fixed shelf within the compartment. In operation, the spare tire is easily extended to an angular position with respect to the rear of the car where it is easily accessible and requires a minimum of lifting by the operator.

My invention will be best understood from the following detailed description taken in connection with the accompanying drawing and its scope will be pointed out in the appended claims.

In the drawing, Figure 1 is a perspective view of the rear end and luggage compartment of the average passenger automobile with my tire carrier in place, and with portions of the body broken away to illustrate better the features of my invention.

Figure 2 is a top plan view of the carrier itself removed from the housing and from the luggage compartment and shown in a partially extended position.

Figure 3 is a side elevation view of the carrier itself in the fully extended position showing a tire mounted in place thereon. Figure 4 is a sectional view of the tire carrier itself taken along the line 4—4 of Figure 2 looking in the direction of the arrows, and showing the interlocking construction of the sliding frames. Figure 5 is another sectional view of the carrier itself taken along the line 5—5 of Figure 2 and looking in the direction of the arrows.

Referring now to Figure 1 of the drawing, I have shown the rear portion of the body 1 of the automobile from which the luggage compartment cover or closure has been removed and showing the rear deck or platform 2 on which is mounted the tire enclosing housing 3. A portion of the housing 3 is broken away to show the tire itself 4, in position within the housing and the tire is firmly secured to the extensible carrier, shown generally at 5, by means of the flat plate clamp 6, through bolt or stud 7 and wing nut 8. It will be noted that the housing 3 is substantially of rectangular cross section comprising side walls, a top, and a recessed bottom portion in which the tire carrier 5 is disposed. The housing 3 is preferably made of sheet metal or another light strong material which will support additional weight on the top thereof so that the top may be used for additional luggage or article storage space.

While Figure 1 shows my invention as installed in a conventional automobile luggage compartment, it will be apparent that if the automobile is designed and manufactured with the idea of embodying the tire carrier in the original design, the floor or deck 2 of the rear compartment would be recessed a small amount to accommodate the low overall height of the carrier, thereby permitting some economy of space in the luggage compartment. By actual measurement I have found that the carrier may be held to a height of only 1 to 1¼ inches.

When the carrier is positioned centrally of the luggage compartment, it has been found that in its extended position the tire will clear the average automobile bumper 9 and the bumper guards 10 without any alteration in this part of the automobile. This feature permits the installation of my improved tire carrier readily in existing automobiles.

As shown in Figure 2, the carrier 5 comprises three parts or frames, each one of which is slidable with respect to its adjacent frame. The stationary or base member, shown at the left, comprises a pair of parallel guide rails 11 and 12 which are maintained in this relationship by means of the end pieces 13 and 14 which also serve as mounting supports by which the carrier is secured to the deck 2 of the automobile luggage compartment. Two bolt holes 15 are shown in each of the end members 13 and 14 for this purpose. Referring to Figure 4, it will be noted that the guide rails 11 and 12 are formed of angle sections with their flanges outwardly turned. Their end members 13 and 14 are likewise formed of angle sections.

The intermediate frame which rests upon and is in sliding engagement with the base frame is composed of a pair of spaced guide rails 16 and 17 which are also formed of angle sections, being joined at their ends and maintained in rigid relationship by means of the end members 18 and 19. The angle sections 16 and 17 of the intermediate frame as shown in Figure 4 and Figure 5 are reversed with their flanges positioned inwardly and spaced so that they extend around the outward edges of the flanges 11 and 12 of the base frame.

The intermediate frame is maintained in sliding relationship and prevented from raising off of the base frame by means of two pairs of circular studs or bosses 20 and 21, one pair, 20 and 20', is located at the extreme left or inner end of the intermediate frame, the other pair, 21 and 21', being located approximately at the midpoint of the inner frame. These circular studs or bosses serve the dual purpose of interlocking the intermediate frame to the base frame to prevent separation of the frames as well as acting as stops or limits to the range of sliding movement to the intermediate frame with respect to the base frame. Thus it will be seen in Figures 2 and 3 that the studs 21 and 21' make contact with the end member 14 of the base frame and thereby prevent any further extension of the intermediate frame from that shown in Figure 3 of the drawing. In a similar manner the studs 20 and 20' insure that the intermediate frame will not overshoot or extend past the left end of the base frame since the studs 20 and 20' will make contact with the end piece 13 of the base frame at this point.

The tire carriage itself is a third sliding frame which completely surrounds, except at the bottom, the two previously described slidable frames and is composed of a pair of channel sections 22 and 23 which are held in spaced parallel relationship by means of spacing members 24 and 25 at each end respectively. In addition, a tire mounting plate 26 is centrally located spanning the channel sections and carries a reinforced section 27 which is threaded to receive the mounting stud 7 which securely bolts the tire to the tire carriage. The mounting stud 7 is preferably threaded at both ends so that when the housing 3 is not used and the space tire is not being carried, the entire luggage space is made available by removal of the bolt 7 from its support 27. The tire carriage or outer frame slides upon the intermediate frame and is secured thereto by means of a pair of pins 28 and 29 which ride in slots 30 in the channels 22 and 23 as shown in Figure 3. The relationship of the pins 28 and 29 to the slots 30 in the channels 22 and 23 is also shown in Figures 4 and 5. Conventional washers and cotter keys may be placed near the outer ends of the pins 28 and 29 to prevent undue sidewise motion of the tire carriage relative to the intermediate frame.

In Figure 3, it is important to note that the slots 30 extend only approximately two-thirds of the length of the channel sections 22 and 23. This is important and an advantage since it prevents withdrawal of the tire carriage for its full length, in which position with the pivot or fulcrum at the extreme left end, the weight of the tire and the carriage itself that would have to be handled by the operator would be considerable. With my construction as shown in Figure 3, a portion of the weight of the tire and carriage lies to the left of the fulcrum or pivot pin 28 and thus helps materially to counterbalance the weight that the motorist must lift or lower in connection with the removal or replacement of a spare tire. I have found that with the conventional automobile, the height of the rear deck bumper above the ground is such that the tire and carriage, in its fully extended position, will rest on the ground at approximately a 45 to 60 degree angle, as shown in Figure 3 of the drawing. It is thus in an easy and accessible position for removal of the tire. A flexible strap or loop 31 made of leather or fabric is secured through a slot 32 in the end piece 25 for manually operating the carriage, and has been found superior to rigid handles directly mounted on the end piece 25, since the strap allows the tire to be lowered without necessity of placing the hand under or adjacent the bottom of the tire in the lowering and raising operation.

While the clearances between the sliding frames have been necessarily somewhat exaggerated in the drawing, I have found that by careful construction wherein close tolerances between the sliding members are maintained and lightweight strong materials are utilized, the need for rollers or bearings between the sliding surfaces is eliminated and there is an absolute minimum of vibration or noise accompanying the installation of my device in a passenger automobile.

From the foregoing, it will be seen that I have provided an improved extensible tire carrier which is not only simple and fool-proof in operation, but also combines the advantages of low initial cost, conservation of luggage compartment space due to its low overall height, and the elimination of much physical distress usually occasioned in the removal and replacement of spare wheels and tires as customarily carried in passenger automobiles. It will be obvious to anyone that the same construction as I have shown herein can be applied on a larger scale to truck or bus wheels and tires, and may be adapted for mounting within such space as may be available on these vehicles either within or underneath the body.

While I have shown and described a particular embodiment of my invention, it will be obvious to those skilled in the art that changes and modifications may be made therein without departing from my invention in its broader aspects and I, therefore, aim in the appended claims to cover all such changes and modifications as fall within the true spirit and scope of my invention.

What I claim as new and desire to secure by Letters Patent of the United States is:

1. An extensible auto tire carrier comprising, a slidable tire carrying member, a second member nested within said tire carrying member and slidable therein, a base member nested within said second member, said tire carrying member and said second member being slidably extensible with respect to said base member, and pivot means interconnecting said tire carrying member and said second member, said pivot means being effective to permit limited angular movement of said tire carrying member relative to said second member and said base member.

2. An extensible and retractable load carrier comprising, a fixed frame of parallel guide rails, an intermediate frame slidable with respect to and surrounding on three sides said fixed frame, stop means for limiting sliding movement of said frames relative to each other, a load carrying frame slidably interconnected to said intermediate frame and substantially enclosing said intermediate frame, and pivot means associated with said intermediate and said load carrying frames and effective in the extended position of said load carrying frame to permit limited angular movement of said last mentioned frame relative to said intermediate frame.

3. A tire carrier comprising, a tire enclosing housing, a fixed pair of parallel guide rails secured within said housing, an intermediate frame slidably mounted on said guide rails, means carried by said intermediate frame for limiting the extent of sliding movement and for maintaining said intermediate frame interlocked with said guide rails, a tire carrying frame slidably connected to said intermediate frame and movable from a retracted position within said housing to an extended position outside of said housing, a pair of longitudinal slots in said tire carrying frame, and pivot means on said intermediate frame coacting with said longitudinal slots and operative in the extended position of said tire carrying frame to permit limited angular movement of said tire carrying frame relative to said housing and said guide rails.

4. An auto tire carrier adapted for mounting within the luggage compartment of an automobile body comprising, a tire carriage including means thereon for securing a tire thereto, an intermediate frame nested within said carriage, a fixed set of runners nested within said intermediate frame, said carriage and said intermediate frame being slidable with respect to each other and to said set of runners, whereby said carriage is moveable from a position within said compartment to a position entirely outside of said compartment, means on said intermediate frame and said carriage operative to permit pivotal movement of said carriage when said carriage is in the position outside of said luggage compartment, said carriage being in a partially balanced condition when in the extreme extended position.

5. An extensible tire carrier comprising, a fixed frame of parallel guide rails, an intermediate frame mounted on said rails and slidable with respect thereto, a load carrying frame slidably connected to said intermediate frame, and pivot means interconnecting said intermediate frame and said load carrying frame, said pivot means being positioned so that in the extended position of said load carrying frame a portion of the weight of said last mentioned frame and load thereon will partially counter-balance the major portion of the weight of said load and load carrying frame.

6. A tire carrier adapted for mounting within the luggage compartment of an automobile body comprising, a substantially box-like tire enclosing housing, a pair of spaced runners secured within said housing, a sliding frame mounted on said runners, a tire supporting carriage mounted on said frame for sliding movement relative thereto, said carriage being extensible from a position within said housing to a position entirely outside of said housing, and pivot means interconnecting said frame and said carriage and effective in the fully extended position of said carriage to permit limited angular movement of said carriage relative to said frame and said housing, said pivot being positioned so that approximately a third of the weight of said carriage will oppose or counter-balance the major portion of the weight of said carriage when said carriage is in the extended position.

CHESTER L. LUNDGREN.

REFERENCES CITED

The following references are of record in the file of this patent:

UNITED STATES PATENTS

| Number | Name | Date |
|---|---|---|
| 420,605 | McCauley | Feb. 4, 1890 |
| 1,854,406 | Hughes | Apr. 19, 1932 |
| 2,014,019 | Girl | Sept. 10, 1935 |
| 2,016,955 | Bryant | Oct. 8, 1935 |
| 2,034,834 | Robinson, Jr. | Mar. 24, 1936 |
| 2,036,472 | Grimshaw | Apr. 7, 1936 |
| 2,091,068 | Girl | Aug. 24, 1937 |
| 2,091,071 | Girl | Aug. 24, 1937 |
| 2,249,845 | Mitchell | July 22, 1941 |
| 2,284,419 | Greig | May 26, 1942 |
| 2,391,310 | Heller | Dec. 18, 1945 |
| 2,490,014 | Brand | Dec. 6, 1949 |

FOREIGN PATENTS

| Number | Country | Date |
|---|---|---|
| 282,568 | Great Britain | Dec. 29, 1927 |
| 464,805 | France | Jan. 22, 1914 |